(12) United States Patent
Dharmavaram et al.

(10) Patent No.: US 12,106,245 B2
(45) Date of Patent: Oct. 1, 2024

(54) ARTIFICIAL INTELLIGENCE (AI) BASED SYSTEM AND METHOD FOR ANALYZING BUSINESSES DATA TO MAKE BUSINESS DECISIONS

(71) Applicant: Exafluence Inc USA, South Brunswick, NJ (US)

(72) Inventors: Ravikiran Dharmavaram, North Brunswick, NJ (US); Karthikeyan Sankaran, Chennai (IN); Jeevan Jamakayala, Vayalpad (IN)

(73) Assignee: Exafluence Inc USA, South Brunswick, NJ (US)

( * ) Notice: Subject to any disclaimer, the term of this patent is extended or adjusted under 35 U.S.C. 154(b) by 249 days.

(21) Appl. No.: 17/744,809

(22) Filed: May 16, 2022

(65) Prior Publication Data

US 2023/0368110 A1 Nov. 16, 2023

(51) Int. Cl.
*G06Q 10/00* (2023.01)
*G06F 16/2458* (2019.01)
(Continued)

(52) U.S. Cl.
CPC ..... *G06Q 10/0637* (2013.01); *G06F 16/2465* (2019.01); *G06N 7/01* (2023.01);
(Continued)

(58) Field of Classification Search
USPC ................. 705/7.14, 7.28, 4, 7.38
See application file for complete search history.

(56) References Cited

U.S. PATENT DOCUMENTS

| 7,716,077 B1 * | 5/2010 | Mikurak | G06Q 10/0631 |
| | | | 705/7.12 |
| 7,716,253 B2 * | 5/2010 | Netz | G06Q 10/06 |
| | | | 707/803 |

(Continued)

FOREIGN PATENT DOCUMENTS

WO 2011123352 A2 10/2011

OTHER PUBLICATIONS

Delen, Dursun, and Sudha Ram. "Research challenges and opportunities in business analytics." Journal of Business Analytics 1.1 (2018): 2-12. (Year: 2018).*

(Continued)

*Primary Examiner* — Gurkanwaljit Singh
(74) *Attorney, Agent, or Firm* — Jason C. Cameron

(57) ABSTRACT

A system and method for analyzing businesses data to make business decisions is disclosed. The method includes receiving a request from one or more users via one or more electronic devices to predict a set of insights associated with a business enterprise and generating a set of KPIs and metrics. The method further includes determining health of the business enterprise and predicting the set of insights associated with the business enterprise based on the received request, the generated set of KPIs and metrics, the determined health of the business enterprise and one or more diagnosis parameters by using a data management-based AI model. Further, the method includes outputting the determined health of the business enterprise, the one or more diagnosis parameters and the predicted set of insights on user interface screen of the one or more electronic devices associated with the one or more users.

20 Claims, 10 Drawing Sheets

(51) Int. Cl.
*G06N 7/01* (2023.01)
*G06N 20/00* (2019.01)
*G06Q 10/0637* (2023.01)
*G06Q 10/0639* (2023.01)
*G06Q 40/08* (2012.01)

(52) U.S. Cl.
CPC ....... *G06N 20/00* (2019.01); *G06Q 10/06393* (2013.01); *G06Q 40/08* (2013.01)

(56) References Cited

U.S. PATENT DOCUMENTS

| | | | | |
|---|---|---|---|---|
| 8,200,527 | B1* | 6/2012 | Thompson | G06Q 30/00 |
| | | | | 705/7.41 |
| 8,781,882 | B1* | 7/2014 | Arboletti | G06Q 10/0639 |
| | | | | 705/7.41 |
| 9,189,757 | B2* | 11/2015 | Finlayson | G06Q 10/06 |
| 10,558,746 | B2 | 2/2020 | Goulikar et al. | |
| 11,113,705 | B2* | 9/2021 | Sewak | G06Q 10/063 |
| 11,232,365 | B2 | 1/2022 | Sundararaman et al. | |
| 11,720,845 | B2* | 8/2023 | Bhattacharyya | G06V 40/174 |
| | | | | 705/7.14 |
| 11,928,747 | B2* | 3/2024 | Cella | G06Q 30/0215 |
| 2004/0068429 | A1* | 4/2004 | MacDonald | G06Q 30/0201 |
| | | | | 705/7.29 |
| 2006/0010164 | A1* | 1/2006 | Netz | G06Q 10/06 |
| 2009/0055795 | A1* | 2/2009 | Finlayson | G06Q 10/06 |
| | | | | 717/101 |
| 2013/0054603 | A1* | 2/2013 | Birdwell | G06F 16/2465 |
| | | | | 707/738 |
| 2013/0159310 | A1* | 6/2013 | Birdwell | G06F 16/3331 |
| | | | | 707/758 |
| 2013/0304535 | A1* | 11/2013 | Hu | G06Q 10/10 |
| | | | | 705/7.27 |
| 2014/0095214 | A1 | 4/2014 | Mathe et al. | |
| 2014/0095263 | A1* | 4/2014 | McAlister | G06Q 30/0206 |
| | | | | 705/7.35 |
| 2014/0324521 | A1* | 10/2014 | Mun | G06Q 30/0201 |
| | | | | 705/7.28 |
| 2015/0348066 | A1* | 12/2015 | Sewak | G06Q 10/063 |
| | | | | 705/7.31 |
| 2016/0092803 | A1* | 3/2016 | Boyacigiller | G06F 16/00 |
| | | | | 705/7.27 |
| 2016/0379309 | A1* | 12/2016 | Shikhare | G06Q 40/08 |
| | | | | 705/4 |
| 2017/0178135 | A1* | 6/2017 | Bull | G06Q 20/40 |
| 2018/0025374 | A1 | 1/2018 | Ghosh et al. | |
| 2018/0107734 | A1* | 4/2018 | Galia | G06Q 40/08 |
| 2019/0132224 | A1* | 5/2019 | Verma | G06F 18/24 |
| 2020/0112624 | A1* | 4/2020 | Smith | H04L 43/0817 |
| 2020/0202278 | A1* | 6/2020 | Barton | G06Q 10/06315 |
| 2020/0210947 | A1* | 7/2020 | Devarakonda | G06Q 10/06312 |
| 2021/0089860 | A1* | 3/2021 | Heere | G06N 20/00 |
| 2022/0300881 | A1* | 9/2022 | Singh | G06N 20/10 |
| 2023/0065424 | A1* | 3/2023 | Jain | G06Q 10/0637 |
| 2023/0237404 | A1* | 7/2023 | Jayathirtha | G06Q 10/063 |
| | | | | 705/7.28 |

OTHER PUBLICATIONS

Stodder, David. "Data visualization and discovery for better business decisions." TDWI Research (2013). (Year: 2013).*

* cited by examiner

ARTIFICIAL INTELLIGENCE (AI) BASED SYSTEM AND METHOD FOR ANALYZING BUSINESSES DATA TO MAKE BUSINESS DECISIONS

FIELD OF INVENTION

Embodiments of the present disclosure relate to Artificial Intelligence (AI) based systems and more particularly relates to an AI-based system and method for analyzing businesses data to make business decisions.

BACKGROUND

Business decisions, such as taking strategic, tactical, and operational decisions, are made for a business enterprise to ensure that the business enterprise is operating efficiently to meet desired goals and targets. Conventionally, process of analyzing business data by decision makers, such as Chief Executing Officer (CEO), senior manager and the like, for making the business decisions may be complex, lack consistency and include presumptions. Thus, the business decisions made by using the conventional approach are not accurate and optimal for growth of the business enterprise for meeting the desired goals and targets. Further, the conventional approaches fail to accurately determine current and future state of the business enterprise to enable the one or more decision makers to make most optimal decisions for growth of the business enterprise. The conventional approaches fail to provide a personalized solution based on type of the business enterprise. Thus, the conventional approaches are not efficient and accurate in terms of analyzing the business data to make right business decisions.

Hence, there is a need for an improved system and method for analyzing businesses data to make business decisions, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, an AI based computing system for analyzing businesses data to make business decisions is disclosed. The AI-based computing system includes one or more hardware processors and a memory coupled to the one or more hardware processors. The memory includes a plurality of modules in the form of programmable instructions executable by the one or more hardware processors. The plurality of modules include a data receiver module configured to receive a request from one or more users via one or more electronic devices to predict a set of insights associated with a business enterprise. The request includes: one or more business goals, current business data, department of the one or more users and data context. The plurality of modules also include a metric generation module configured to generate a set of Key Performance Indicators (KPIs) and metrics associated with the business enterprise based on the received request by using a data management-based AI model. The plurality of modules includes a health determination module configured to determine health of the business enterprise based on the received request and the generated set of KPIs and metrics by using the data management-based AI model. The health of the business enterprise represents current state of the business enterprise with respect to the one or more business goals. Further, the plurality of modules include an insight prediction module configured to predict the set of insights associated with the business enterprise based on the received request, the generated set of KPIs and metrics, the determined health of the business enterprise and one or more diagnosis parameters by using the data management-based AI model. The plurality of modules also include a data output module configured to output the determined health of the business enterprise, the one or more diagnosis parameters and the predicted set of insights on user interface screen of the one or more electronic devices associated with the one or more users. The one or more users make one or more business decisions based on the outputted health of the business enterprise, the one or more diagnosis parameters and the set of insights.

In accordance with another embodiment of the present disclosure, an AI based method for analyzing businesses data to make business decisions is disclosed. The AI-based method includes receiving a request from one or more users via one or more electronic devices to predict a set of insights associated with a business enterprise. The request includes: one or more business goals, current business data, department of the one or more users and data context. The AI-based method also includes generating a set of Key Performance Indicators (KPIs) and metrics associated with the business enterprise based on the received request by using a data management-based AI model. The AI-based method further includes determining health of the business enterprise based on the received request and the generated set of KPIs and metrics by using the data management-based AI model. The health of the business enterprise represents current state of the business enterprise with respect to the one or more business goals. Further, the AI-based method includes predicting the set of insights associated with the business enterprise based on the received request, the generated set of KPIs and metrics, the determined health of the business enterprise and one or more diagnosis parameters by using the data management-based AI model. Also, the AI-based method includes outputting the determined health of the business enterprise, the one or more diagnosis parameters and the predicted set of insights on user interface screen of the one or more electronic devices associated with the one or more users. The one or more users make one or more business decisions based on the outputted health of the business enterprise, the one or more diagnosis parameters and the set of insights.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
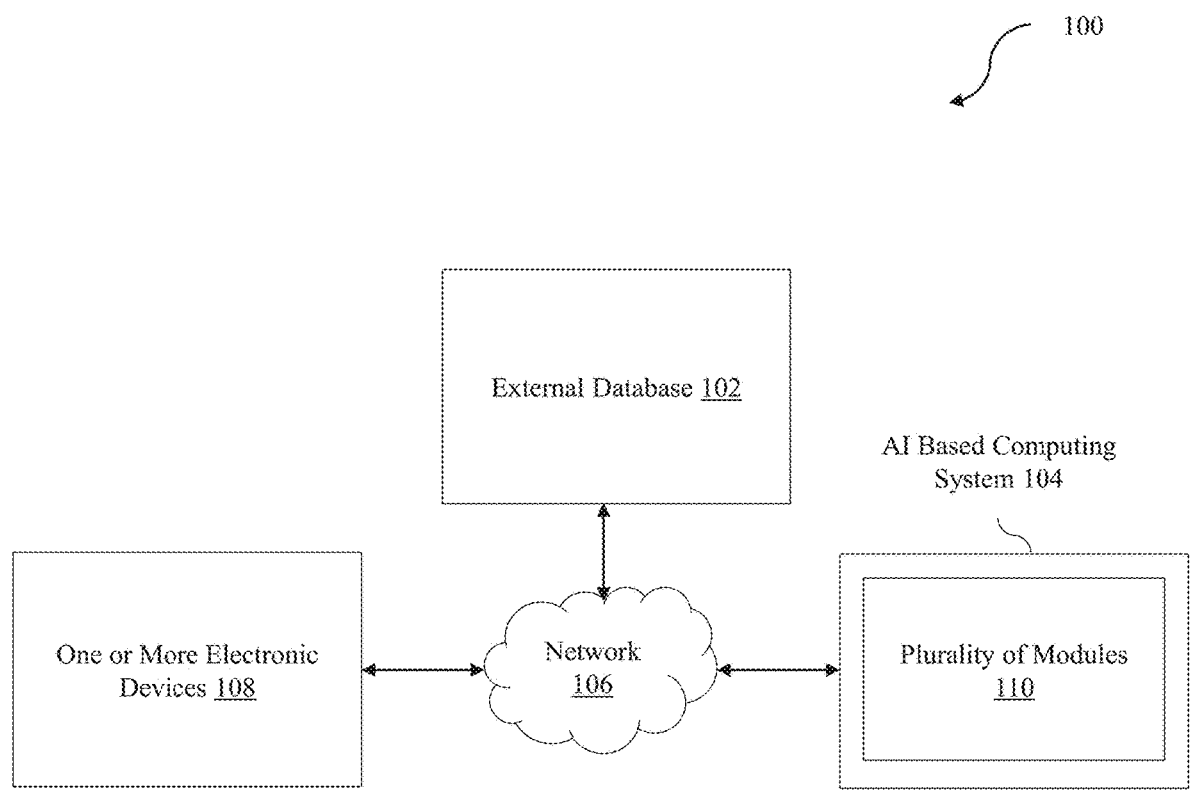
FIG. 1 is a block diagram illustrating an exemplary computing environment for analyzing businesses data to make business decisions, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

FIG. 1 is a block diagram illustrating an exemplary computing environment 100 for analyzing businesses data to make business decisions, in accordance with an embodiment of the present disclosure. According to FIG. 1, the computing environment 100 includes an external database 102 communicatively coupled to an Artificial Intelligence (AI) based computing system 104 via a network 106. In an embodiment of the present disclosure, the AI-based computing system 104 corresponds to a decision canvas for analyzing businesses data to make business decision. The business canvas is a unified, collaborative platform that helps individuals & teams to make decisions from the business data. In an exemplary embodiment of the present disclosure, the external database 102 stores market data associated with one or more business organizations. In an embodiment of the present disclosure, the market data may include a wide range of internal business datasets or external datasets across the different domains. For example, if a decision canvas is implemented for an insurance company on claims, then the market data refers to company's claims dataset from its database in the claims processing canvas. Another example, if a decision canvas is implemented for bank on credit cards, then part of the market data refers to credit card fraud dataset from datahub.io for developing AI model. In an exemplary embodiment of the present disclosure, the external market data for data marketplaces may be Quandl, data world, healthdata.gov and the like. The external market data for free datasets may be data.gov, WorldAtlas (worldatlas.org), ClinicalTrials.gov and the like. The external market data for social media data may be Radian6, Synthesio, and the like. Further, external market data for news feed and blogs may be New York Times (nytimes.com), One to One Corporate Finance (onetoeoncf.com). For example, the external database 102 may correspond to database of one or more websites publishing data associated with the market data. In an embodiment of the present disclosure, the AI-based computing system 104 may be hosted on a central server, such as cloud server or a remote server. Further, the network 106 may be internet or any other wireless network.

Further, the computing environment 100 includes one or more electronic devices 108 associated with one or more users communicatively coupled to the AI-based computing system 104 via the network 106. In an embodiment of the present disclosure, the one or more users are key personnel who are required to make one or more business decisions for a business enterprise. In an exemplary embodiment of the present disclosure, the one or more business decisions include strategic, tactical, operational decisions and the like. The one or more electronic devices 108 are used by the one or more users to request the AI-based computing system 104 to predict a set of insights associated with the business enterprise. The one or more electronic devices 108 may also be used to receive health of the business enterprise, one or more diagnosis parameters and the set of insights. In an exemplary embodiment of the present disclosure, the one or more electronic devices 108 may include a laptop computer, desktop computer, tablet computer, smartphone, wearable device, smart watch and the like.

Furthermore, the one or more electronic devices 108 include a local browser, a mobile application or a combination thereof. Furthermore, the one or more users may use a web application via the local browser, the mobile application or a combination thereof to communicate with the AI-based computing system 104. In an embodiment of the present disclosure, the computing system 104 includes a plurality of modules 110. Details on the plurality of modules 110 have been elaborated in subsequent paragraphs of the present description with reference to FIG. 2.

In an embodiment of the present disclosure, the AI-based computing system 104 is configured to receive the request from the one or more users via the one or more electronic devices 108 to predict the set of insights associated with the business enterprise. Further, the AI-based computing system 104 generates a set of Key Performance Indicators (KPIs) and metrics associated with the business enterprise based on the received request by using a data management-based AI model. The AI-based computing system 104 determines health of the business enterprise based on the received request and the generated set of KPIs and metrics by using the data management-based AI model. The AI computing system 104 predicts the set of insights associated with the business enterprise based on the received request, the generated set of KPIs and metrics, the determined health of the business enterprise and one or more diagnosis parameters by using the data management-based AI model. The AI-based computing system 104 outputs the determined health of the business enterprise, the one or more diagnosis parameters and the predicted set of insights on user interface screen of the one or more electronic devices 108 associated with the one or more users.

Figure 2:
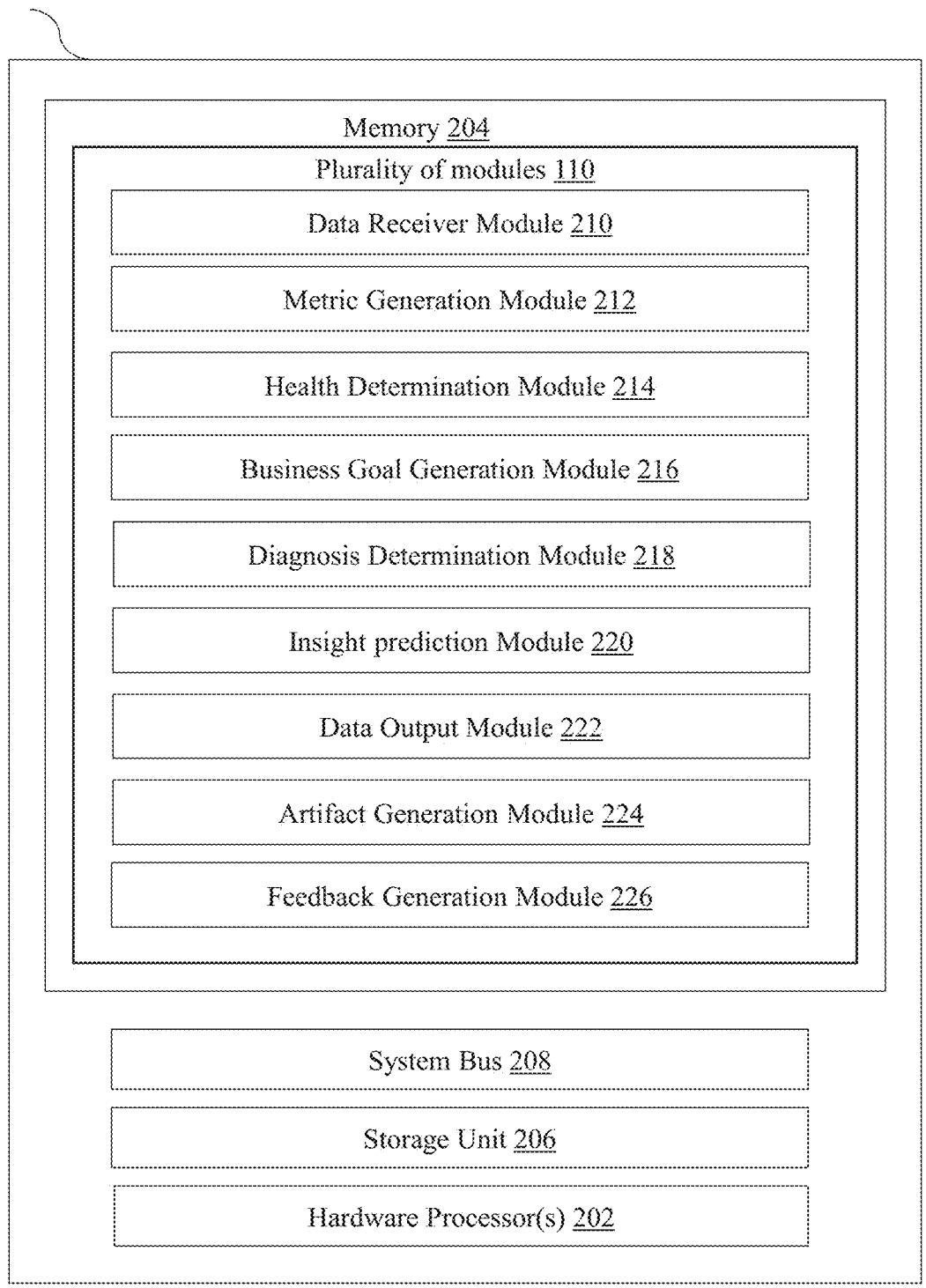
FIG. 2 is a block diagram illustrating an exemplary AI-based computing system for analyzing businesses data to make business decisions, in accordance with an embodiment of the present disclosure.

FIG. 2 is a block diagram illustrating an exemplary AI-based computing system 104 for analyzing businesses data to make business decisions, in accordance with an embodiment of the present disclosure. In an embodiment of the present disclosure, the AI-based computing system 104 corresponds to the decision canvas for analyzing businesses data to make business decision. The business canvas is a unified, collaborative platform that helps individuals & teams to make decisions from the business data. In an embodiment of the present disclosure, the decision canvas is a personalized view for a business decision maker that helps him or her to take decisions from the business data. Further, the AI-based computing system 104 includes one or more hardware processors 202, a memory 204 and a storage unit 206. The one or more hardware processors 202, the memory 204 and the storage unit 206 are communicatively coupled through a system bus 208 or any similar mechanism. The memory 204 comprises the plurality of modules 110 in the form of programmable instructions executable by the one or more hardware processors 202. Further, the plurality of modules 110 includes a data receiver module 210, a metric generation module 212, a health determination module 214, a business goal generation module 216, a diagnosis determination module 218, an insight prediction module 220, a data output module 222, an artifact generation module 224 and a feedback generation module 226.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the plurality of modules 110 stored in the form of machine-readable instructions on any of the above-mentioned storage media and may be in communication with and executed by the one or more hardware processors 202.

The storage unit 206 may be a cloud storage. The storage unit 206 may store the received request, the set of KPIs and metrics, health of the business enterprise and the one or more diagnosis parameters. The storage unit may also store the set of insights, business requirements, one or more artifact parameters, a set of artifacts, market data, one or more market trends and business information.

The data receiver module 210 is configured to receive the request from the one or more users via the one or more electronic devices 108 to predict the set of insights associated with the business enterprise. In an embodiment of the present disclosure, the one or more users are key personnel who are required to make one or more business decisions for the business enterprise. For example, the one or more users may be Chief Executing Officer (CEO). In an exemplary embodiment of the present disclosure, the one or more business decisions include strategic, tactical, operational decisions and the like. In an exemplary embodiment of the present disclosure, the one or more electronic devices 108 may include a laptop computer, desktop computer, tablet computer, smartphone, wearable device, smart watch and the like. The request may include one or more business goals, current business data, department of the one or more users, data context and the like. For example, decision canvas are claims processing, call center operations, loyalty management and the like. In an embodiment of the present disclosure, claims processing decision canvas provides a comprehensive view of all aspects of claims processing lifecycle that helps drive operational and strategic decisions. The goal is to provide a single view of truth on business health by curating data from different business process for head of claims processing. In an embodiment o the present disclosure, the one or more business goals are pre-set goals. For example, department of the one or more users may be finance, insurance, healthcare, retail, telecom and the like. For example, the data context is which specific product or service the business enterprise is associated with and the like. In an embodiment of the present disclosure, one or more Key Performance Indicators (KPIs) and metrics are computed based on the current business data. In an embodiment of the present disclosure, every KPI and metric is computed by running a specific process periodically based on business requirements. The process may be a simple bash program with cron job or a scheduled Extract Transform Load (ETL) pipeline which is designed to aggregate raw data metrics of business process and to compute quality and performance measures/ratios. For example, in claims processing canvas, claims outstanding number is raw data whereas Month-over-Month (MoM) growth rate is computed as part of the pipeline to populate the canvas.

The metric generation module 212 is configured to generate the set of KPIs and metrics associated with the business enterprise based on the received request by using the data management-based AI model. In an embodiment of the present disclosure, the data management-based AI model used for trend analysis is a combination of text analytics & forecasting. Further, input to identifying trends in the marketplace is text data from number of sources, such as blogs, ecommerce reviews, websites, news feeds, social media, annual reports, and other types of market information. In an embodiment of the present disclosure, transformer-based AI models are used to extract entities, relationships and semantic meaning from text and forecast the growth in micro and macro trends over a period of time. In an embodiment of the present disclosure, the data management-based AI model may be Machine Learning (ML) model. In an embodiment of the present disclosure, the set of KPIs and metrics are generated based on the received request and the one or more KPIs and metrics by using the data management-based AI model. In an exemplary embodiment of the present disclosure, the set of KPIs and metrics for insurance claims processing include MoM, claims outstanding, Average Turn Around Time (TAT), Week over Week (WoW), claims paid, claims processed, Min Quarter over Quarter (QoQ) and the like. For sake of the present disclosure, the decision canvas for the business enterprise corresponds to insurance field. However, it must be obvious to a person skilled in the art that the business canvas may correspond to other fields of business, such as healthcare, financial services, retail, telecom and the like.

The health determination module is configured to determine the health of the business enterprise based on the received request and the generated set of KPIs and metrics by using the data management-based AI model. The health of the business enterprise includes the current performance KPIs and metrics of business processes and comparison of them with previous weeks or months or quarters. For example, the health of the business enterprise includes claims outstanding and MoM growth rate of claims outstanding in claims processing canvas, current total customer base and Year-over-Year (YoY) growth rate of total customer base in customer experience canvas, current number of cardholders and card spends Vs MoM growth rate of number of cardholders and card spends in credit cards canvas. In an embodiment of the present disclosure, the health of the business enterprise represents current state of the business enterprise with respect to the one or more business goals. In determining the health of the business enterprise based on the received request and the generated set of KPIs and metrics by using the data management-based AI model, the health determination module 214 compares the one or more business goals with the current business data by using the data management-based AI model. Further, the health determination module 214 correlates result of the comparison with the department of the one or more users, the data context and the set of KPIs and metrics by using the data management-based AI model. Furthermore, the health determination module 214 determines the health of the business enterprise based on result of the correlation by using the data management-based AI model.

In an embodiment of the present disclosure, the business goal generation module 216 is configured to receive market data associated with one or more business organizations from the external database 102. For example, the external database 102 may correspond to database of one or more websites publishing data associated with the market data. In an embodiment of the present disclosure, the one or more business organizations may deal with same industry, product, services or any combination thereof as dealt by the business enterprise. Further, the business goal generation module 216 is configured to determine one or more market trends by using the data management-based AI model. In an embodiment of the present disclosure, every trend follows a trend path, such as trendsetters, early adopters, influencers, followers, mainstream. In an embodiment of the present disclosure, digital footprints corresponding to the one or more market trends may include specialty blogs and forums, review sites, enthusiast blogs and forums, influencer blogs and channels, social channels, news and general forums, product reviews and the like. For example, the specialty blogs and forums may include recipe websites, menus, ChefTalk and the like. The review sites, enthusiast blogs and forums may include yelp, OpenTable, Zagat, cooking bites and the like. The influencer blogs and channels include YouTube channel, influencer twitter, Instagram handles and the like. Further, the social channels, news and general forums include Twitter, Facebook, Instagram, and the like. The product reviews include Amazon Marketplace reviews, Brand e-commerce sites and the like. In an embodiment of the present disclosure, the one or more market trends are determined by performing trend analysis on the market data by using the data management-based AI model. The business goal generation module 216 receives business information from one or more subject matter experts via one or more workshops, one or more meetings or a combination thereof. In an exemplary embodiment of the present disclosure, the business information includes organization entities, transaction data, enterprise data, enterprise structure data and the like. In an embodiment of the present disclosure, the organization entities, the transaction data, the enterprise data, the enterprise structure data and the like are collectively called as business datasets that provide critical information about the business & its workings. For example, the organization entities include customers, products, locations, and the like. The transaction data includes sales orders, loan applications, purchase orders and the like. Further, the enterprise structure data includes bill of materials, organization hierarchy, sales territory hierarchy and the like. In an exemplary embodiment of the present disclosure, the one or more subject matter experts may be one or more business users, one or more decision makers or a combination thereof. In an embodiment of the present disclosure, the business information is extracted via knowledge solicitation from the one or more workshops, the one or more meetings or a combination thereof. For example, the one or more workshops may be joint workshops. Furthermore, the business goal generation module 216 generates the one or more business goals based on the determined one or more market trends and the received business information by using the data management-based AI model. In an exemplary embodiment of the present disclosure, the one or more goals may be quantitative business goals desired to be achieved by the one or more users.

The diagnosis determination module 218 is configured to determine the one or more diagnosis parameters associated with the business enterprise based on the received request, the generated set of KPIs and metrics and the determined health of the business enterprise by using the data management-based AI model. In an embodiment of the present disclosure, the one or more diagnosis parameters helps into different areas for diagnostic analysis. In an exemplary embodiment of the present disclosure, the one or more diagnosis parameters for insurance claims processing include view claims, diagnose process bottlenecks, claims analysis, fraudulent claims and the like.

The insight prediction module 220 is configured to predict the set of insights associated with the business enterprise based on the received request, the generated set of KPIs and metrics, the determined health of the business enterprise and the determined one or more diagnosis parameters by using the data management-based AI model. In an embodiment of the present disclosure, the set of insights are in form of future state metrics and KPIs. In an exemplary embodiment of the present disclosure, the set of insights for insurance claims processing include forecast claims volume for pre-defined period of time, predict fraudulent claims, forecast pay-outs amount for predefined period of time, predict fast track claims and the like. In an embodiment of the present disclosure, the one or more users may adapt to the set of insights via simulation, optimization and the like. The optimization is a method which aims to achieve business goals efficiently by optimizing the business processes subject to various constraints. In an embodiment of the present disclosure, optimized processes lead to efficient business outcomes. Further, the simulation is a process by which business ascertain changes to output based on changes to inputs in a time-variant manner in which the system is subject to non-linear interactions. In an embodiment of the present disclosure, a simulation model represents a real-world business process.

In an embodiment of the present disclosure, the data management-based AI model is generated based on historical data. The historical data is training data.

The data output module 222 configured to output the determined health of the business enterprise, the determined one or more diagnosis parameters and the predicted set of insights on user interface screen of the one or more electronic devices 108 associated with the one or more users. In an embodiment of the present disclosure, the one or more users make one or more business decisions based on the outputted health of the business enterprise, the one or more diagnosis parameters and the set of insights. In an embodiment of the present disclosure, the one or more diagnosis parameters are outputted on the user interface screen of the one or more electronic devices 108 in one or more formats. In an exemplary embodiment of the present disclosure, the one or more formats include cubes, dashboards, report and the like. In an embodiment of the present disclosure, the determined health of the business enterprise, the determined one or more diagnosis parameters and the predicted set of insights are outputted on the user interface screen via different levels or panels.

In an embodiment of the present disclosure, each decision canvas includes two underlying configuration files which store all relevant details for creating the decision canvas. In an exemplary embodiment of the present disclosure the two underlying configuration files are in JavaScript Object Notation (JSON) format. The two underlying configuration files are stored in the storage unit. In an embodiment of the present disclosure, the two underlying configuration files and setup of a set of artifacts for the decision canvas is created by utilizing the artifact generation module 224.

The artifact generation module 224 is configured to receive business requirements from the one or more users via the one or more electronic devices 108. In an embodiment of the present disclosure, to build a business canvas solution, a lead consultant talks to a business team and identifies a business objective, corresponding goals, available data maturity, and measurable outcomes for evaluation. Further, the lead consultant then discusses with an offshore team to develop hypotheses, design a solution approach, and build a solution. The solution is then presented to client teams, reviewed, and then deployed as required. For example, the business requirements may include how are the current performances of business processes, what are the root causes of performance issues, how can the business predict and adapt to the future and the like. Further, the artifact generation module 224 determines one or more artifact parameters based on the received business requirements by using the data management-based AI model. In an exemplary embodiment of the present disclosure, the one or more artifact parameters include actual artifacts, screen configuration, artifacts configuration and the like. Furthermore, the artifact generation module 224 generates the set of artifacts based on the received business requirements and the determined one or more artifact parameters by using the data management-based AI model. In an embodiment of the present disclosure, the set of artifacts are set of KPIs and metrics of business processes computed and stored in the storage unit 206. Each component or artifact in a decision canvas is built from a low code engine that serves as superset of all artifacts required to create the decision canvas. In an embodiment of the present disclosure, depending on a particular requirement for the decision canvas, a subset of the components may be selected to create a solution. For example, the set of artifacts across different industries include claims outstanding, average TAT, number of calls in last 24 hours, average response time and the like. In an embodiment if the present disclosure, the set of artifacts are outputted on the user interface screen of the one or more electronic devices 108, such that the one or more users may make the one or more business decisions in real-world. Further, each component in the decision canvas is built from a low code engine that serves as a superset of the set of artifacts required to create the decision canvas. In an embodiment of the present disclosure, depending on a particular requirement for the decision canvas, a subset of these components may be chosen to build the decision canvas.

In an embodiment of the present disclosure, the feedback generation module 226 is configured to generate one or more feedbacks associated with the one or more business goals by comparing the one or more business goals with the current business data by using the data management-based AI model. In an exemplary embodiment of the present disclosure, the one or more feedbacks corresponds to one or more categories, such as performance against pre-set goals, decisions taken based on predictive capability of the canvas which in turn have proven to be wrong or not successful and business process simulations performed with embedded ML or AI models to view possible realities and the feedback from the simulation models helps to recalibrate the models. In an embodiment of the present disclosure, the one or more feedbacks may facilitate in retraining the data management-based AI model. In an embodiment of the present disclosure, the one or more feedbacks are provided to the one or more subject matter experts to update the one or more business goals.

Figure 3:
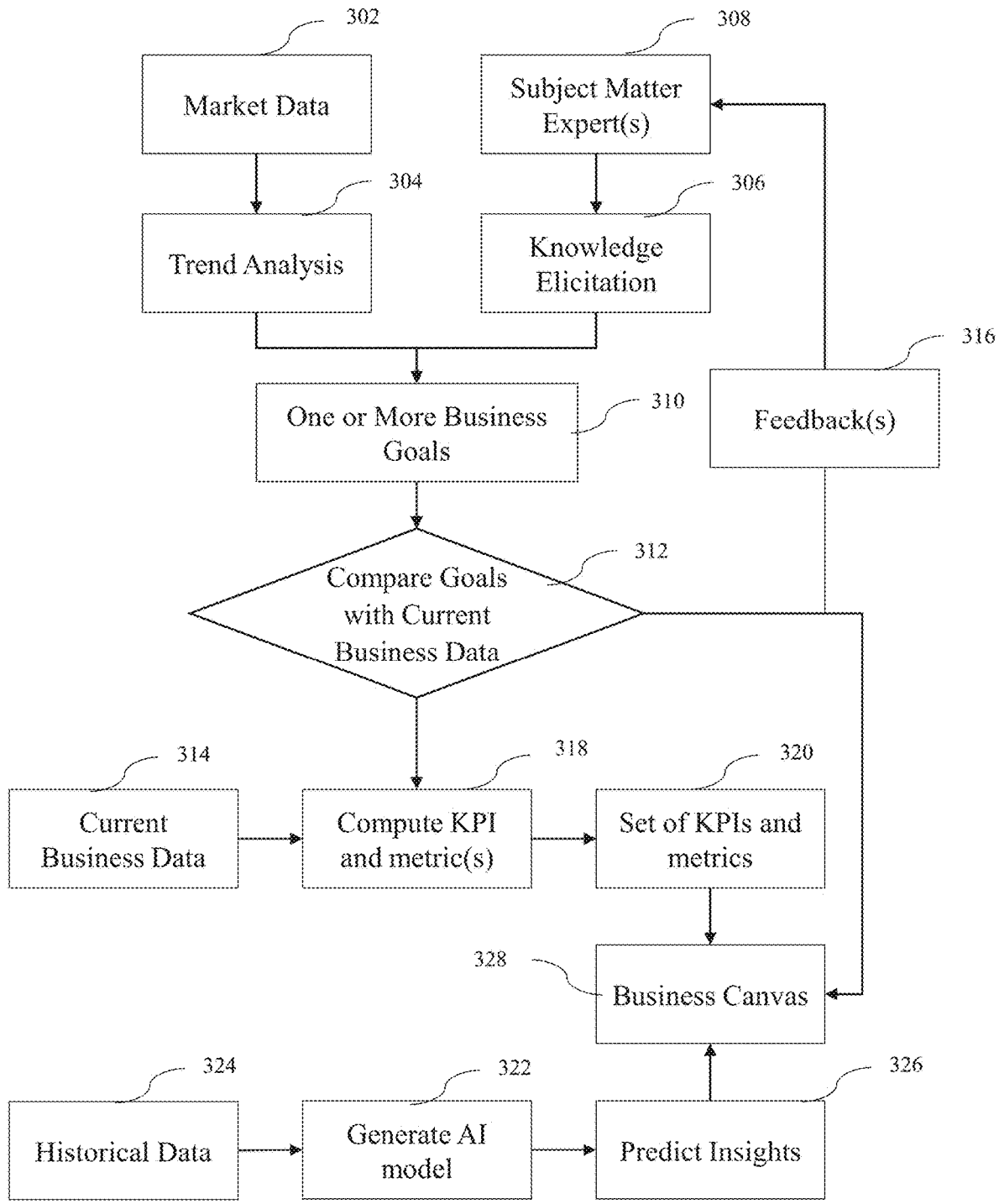
FIG. 3 is a block diagram illustrating an exemplary operation of the AI-based computing system for analyzing businesses data to make business decisions, in accordance with an embodiment of the present disclosure.

FIG. 3 is a block diagram illustrating an exemplary operation of the AI-based computing system 104 for analyzing businesses data to make business decisions, in accordance with an embodiment of the present disclosure. In an embodiment of the present disclosure, the market data 302 associated with the one or more business organizations is received from the external database 102. Further, trend analysis 304 is performed on the market data 302 to determine the one or more market trends by using the data management-based AI model. Furthermore, the business information is extracted via knowledge elicitation 306 from the one or more workshops, the one or more meetings or a combination thereof through the one or more subject experts 308. The one or more business goals 310 are generated based on the determined one or more market trends and the business information by using the data management-based AI model. At 312, the one or more business goals 310 are compared with the current business data 314 by using the data management-based AI model to generate the one or more feedbacks 316 associated with the one or more business goals 310. In an embodiment of the present disclosure, the one or more feedbacks 316 are provided to the one or more subject matter experts 308 to update the one or more business goals 310. In an embodiment of the present disclosure, the one or more KPIs and metrics are computed based on the current business data 314 at 318. Further, the set of KPIs and metrics 320 associated with the business enterprise are generated based on the comparison of the one or more business goals 310 with the current business data 314, the computed one or more KPIs and metrics, the department of the one or more users and the data context by using the data management-based AI model. In an embodiment of the present disclosure, the data management-based AI model is generated at 322 based on the historical data 324. The historical data 324 is training data. Furthermore, the set of insights associated with the business enterprise are predicted at 326 based on the comparison of the one or more business goals 310 with the current business data 314, the computed one or more KPIs and metrics, the department of the one or more users and the data context, the generated set of KPIs and metrics, the health of the business enterprise and the one or more diagnosis parameters by using the data management-based AI model. In an embodiment of the present disclosure, the set of insights are in the form of future state metrics and KPIs. Further, the set of KPIs and metrics and the predicted set of insights associated with the business enterprise form the business canvas 328 for the business enterprise. In an embodiment of the present disclosure, the one or more users make the one or more business decisions based on the generated business canvas 328.

Figure 4:
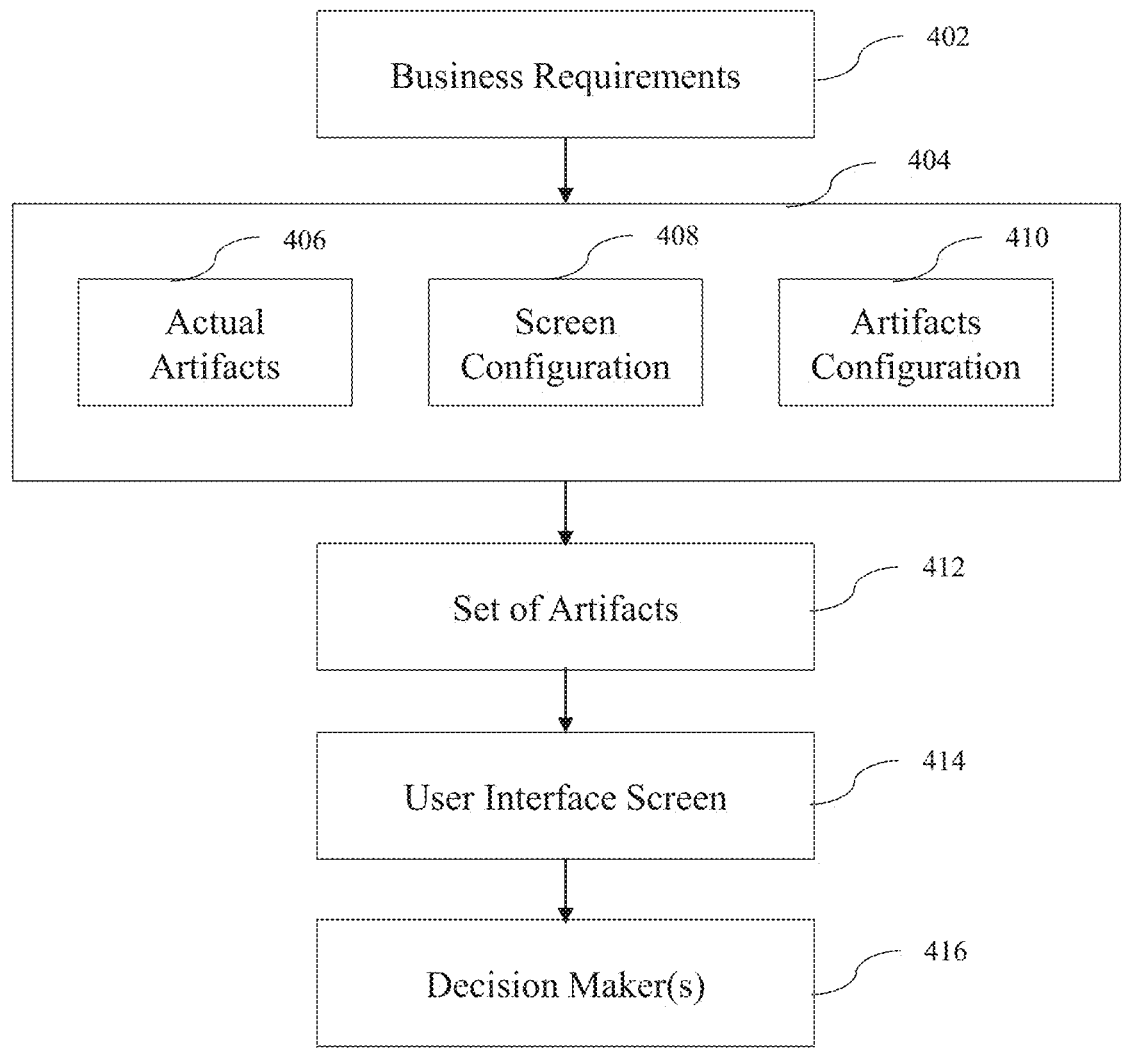
FIG. 4 is a block diagram illustrating an exemplary set of steps for generating set of artifacts, in accordance with an embodiment of the present disclosure.

FIG. 4 is a block diagram illustrating an exemplary set of steps for generating set of artifacts, in accordance with an embodiment of the present disclosure. In an embodiment of the present disclosure, the business requirements 402 are received from the one or more users via the one or more electronic devices 108. In an exemplary embodiment of the present disclosure, the one or more users may be an individual or a team making the one or more business decisions. Further, the one or more artifact parameters 404 are determined based on the received business requirements by using the data management-based AI model. In an exemplary embodiment of the present disclosure, the one or more artifact parameters 404 include actual artifacts 406, screen configuration 408 and artifacts configuration 410. Furthermore, the set of artifacts 412 are generated based on the received business requirements 402 and the determined one or more artifact parameters 404 by using the data management-based AI model. In an embodiment if the present disclosure, the set of artifacts 412 are outputted on the user interface screen 414 of the one or more electronic devices 108, such that one or more decision makers 416 may make the one or more business decisions in real-world. For example, the one or more decision makers 416 are CEO and the like. In an exemplary embodiment of the present disclosure, the one or more business decisions include strategic, tactical, operational decisions and the like.

Figure 5:
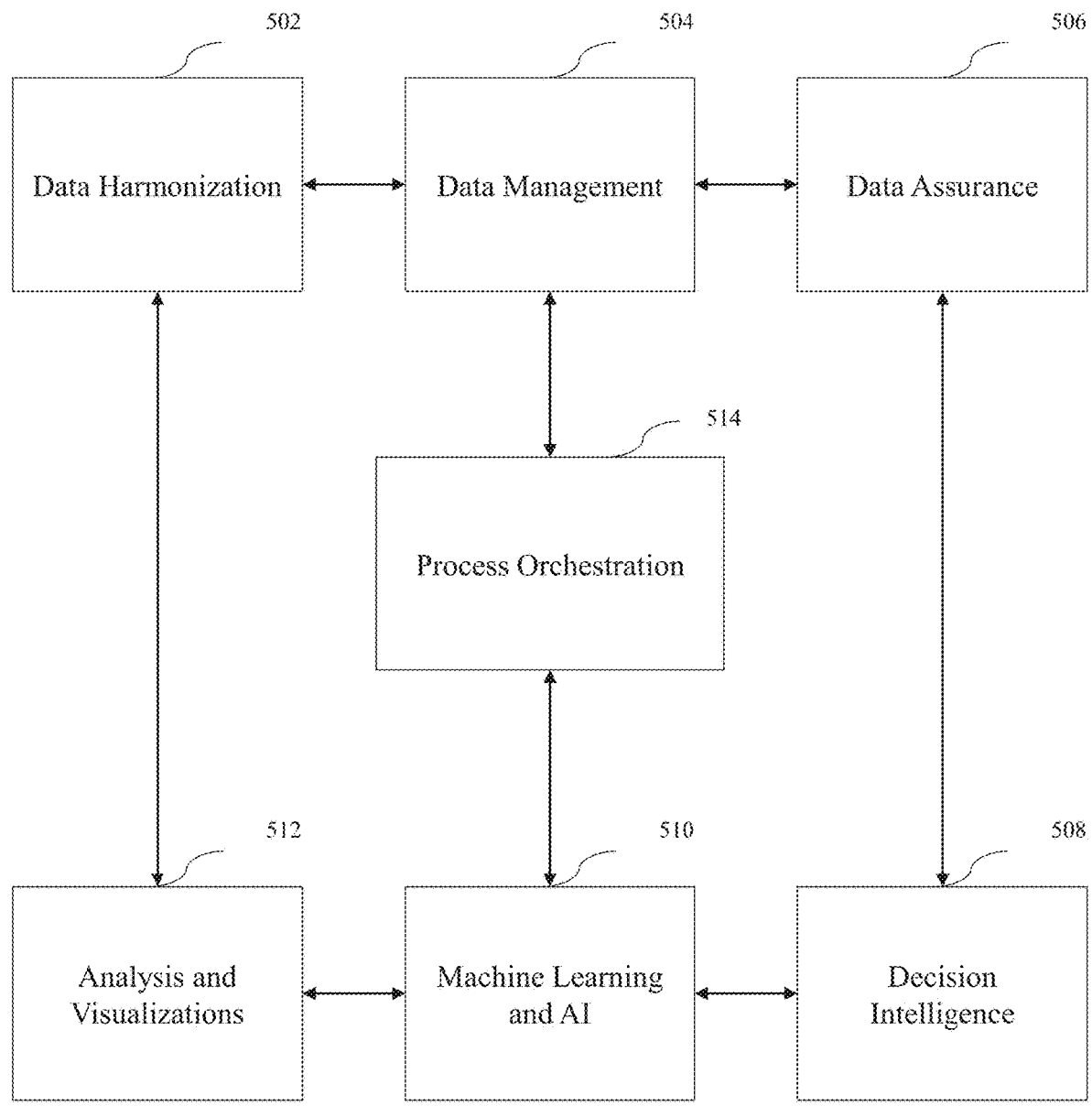
FIG. 5 is a block diagram illustrating exemplary features of the AI-based computing system, in accordance with another embodiment of the present disclosure.

FIG. 5 is a block diagram illustrating exemplary features of the AI-based computing system 104, in accordance with another embodiment of the present disclosure. In an embodiment of the present disclosure, a set of features of the AI-based computing system 104 include data harmonization 502, data management 504, data assurance 506, decision intelligence 508, machine learning and AI 510, analysis and virtualizations 512 and process orchestration 514. For example, the data harmonization 502 includes data mapping and transformation, unstructured data processing and data migration i.e., left and shift. In an exemplary embodiment of the present disclosure, the data management 504 includes data catalog, metadata 360 and industry specific data models. For example, the data assurance 506 includes data profiling, data quality rules and test 360. In an exemplary embodiment of the present disclosure, decision intelligence 508 includes process mining, simulations and optimization. For example, machine learning and AI 510 includes machine learning model training, machine learning model serving and universal bot. In an exemplary embodiment of the present disclosure, analysis and visualizations 512 include multi-dimensional analysis and data visualization i.e., open source, and pre-built dashboards. For example, the process orchestration 514 includes workflow scheduling, process KPIs and dashboards and robotic process automation. In an embodiment of the present disclosure, the set of features may also include reverse engineering and data consumption. The reverse engineering includes Extract, Transform, Load (ETL) spark converter, Structured Query Language (SQL) stored procedure parser and java and cobol code parser. Further, the data consumption includes Rest Application Programming Interfaces (APIs), GraphSQL APIs, API gateway and graph database.

Figure 6:
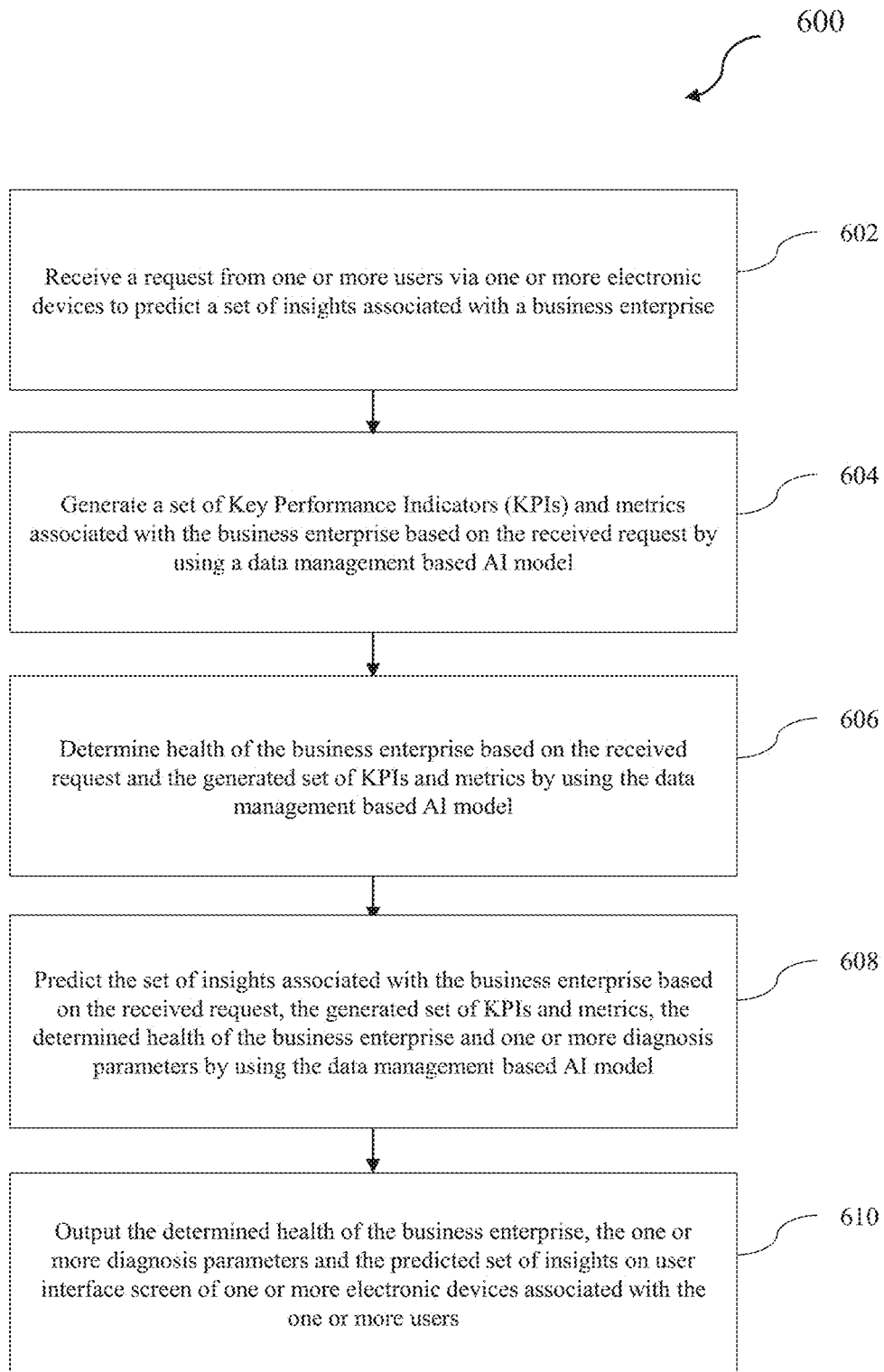
FIG. 6 is a process flow diagram illustrating an exemplary AI-based method for analyzing businesses data to make business decisions, in accordance with an embodiment of the present disclosure.

FIG. 6 is a process flow diagram illustrating an exemplary AI-based method for analyzing businesses data to make business decisions, in accordance with an embodiment of the present disclosure. In an embodiment of the present disclosure, the AI-based method is performed by a decision canvas for analyzing businesses data to make business decision. The business canvas is a unified, collaborative platform that helps individuals & teams to make decisions from the business data. In an embodiment of the present disclosure, the decision canvas is a personalized view for a business decision maker that helps him or her to take decisions from the business data. At step 602, a request is received from one or more users via one or more electronic devices 108 to predict a set of insights associated with a business enterprise. In an embodiment of the present disclosure, the one or more users are key personnel who are required to make one or more business decisions for the business enterprise. For example, the one or more users may be Chief Executing Officer (CEO). In an exemplary embodiment of the present disclosure, the one or more business decisions include strategic, tactical, operational decisions and the like. In an exemplary embodiment of the present disclosure, the one or more electronic devices 108 may include a laptop computer, desktop computer, tablet computer, smartphone, wearable device, smart watch and the like. The request may include one or more business goals, current business data, department of the one or more users, data context and the like. In an embodiment o the present disclosure, the one or more business goals are pre-set goals. For example, department of the one or more users may be finance, insurance, healthcare, retail, telecom and the like. For example, the data context is which specific product or service the business enterprise is associated with and the like. In an embodiment of the present disclosure, one or more Key Performance Indicators (KPIs) and metrics are computed based on the current business data. In an embodiment of the present disclosure, every KPI and metric is computed by running a specific process periodically based on business requirements. The process may be a simple bash program with cron job or a scheduled Extract Transform Load (ETL) pipeline which is designed to aggregate raw data metrics of business process and to compute quality and performance measures/ratios. For example, in claims processing canvas, claims outstanding number is raw data whereas Month-over-Month (MoM) growth rate is computed as part of the pipeline to populate the canvas.

At step 604, a set of Key Performance Indicators (KPIs) and metrics associated with the business enterprise are generated based on the received request by using a data management-based AI model. In an embodiment of the present disclosure, the data management-based AI model used for trend analysis is a combination of text analytics & forecasting. Further, input to identifying trends in the marketplace is text data from number of sources, such as blogs, ecommerce reviews, websites, news feeds, social media, annual reports, and other types of market information. In an embodiment of the present disclosure, transformer-based AI models are used to extract entities, relationships and semantic meaning from text and forecast the growth in micro and macro trends over a period of time. In an embodiment of the present disclosure, the data management-based AI model may be Machine Learning (ML) model. In an embodiment of the present disclosure, the set of KPIs and metrics are generated based on the received request and the one or more KPIs and metrics by using the data management-based AI model. In an exemplary embodiment of the present disclosure, the set of KPIs and metrics for insurance claims processing include MoM, claims outstanding, Average Turn Around Time (TAT), WoW, claims paid, claims processed, Min QoQ and the like. For sake of the present disclosure, the decision canvas for the business enterprise corresponds to insurance field. However, it must be obvious to a person skilled in the art that the business canvas may correspond to other fields of business, such as healthcare, financial services, retail, telecom and the like.

At step 606, health of the business enterprise is determined based on the received request and the generated set of KPIs and metrics by using the data management-based AI model. The health of the business enterprise includes the current performance KPIs and metrics of business processes and comparison of them with previous weeks or months or quarters. For example, the health of the business enterprise includes claims outstanding and MoM growth rate of claims outstanding in claims processing canvas, current total customer base and Year-over-Year (YoY) growth rate of total customer base in customer experience canvas, current number of cardholders and card spends Vs MoM growth rate of number of cardholders and card spends in credit cards canvas. In an embodiment of the present disclosure, the health of the business enterprise represents current state of the business enterprise with respect to the one or more business goals. In determining the health of the business enterprise based on the received request and the generated set of KPIs and metrics by using the data management-based AI model, the AI-based method 600 includes comparing the one or more business goals with the current business data by using the data management-based AI model. Further, the AI-based method 600 include correlating result of the comparison with the department of the one or more users, the data context and the set of KPIs and metrics by using the data management-based AI model. Furthermore, the AI-based method 600 includes determining the health of the business enterprise based on result of the correlation by using the data management-based AI model.

In an embodiment of the present disclosure, the AI-based method 600 includes receiving market data associated with one or more business organizations from the external database 102. For example, the external database 102 may correspond to database of one or more websites publishing data associated with the market data. In an embodiment of the present disclosure, the one or more business organizations may deal with same industry, product, services or any combination thereof as dealt by the business enterprise. Further, the AI-based method 600 includes determining one or more market trends by using the data management-based AI model. In an embodiment of the present disclosure, the one or more market trends are determined by performing trend analysis on the market data by using the data management-based AI model. The AI-based method 600 includes receiving business information from one or more subject matter experts via one or more workshops, one or more meetings or a combination thereof. In an exemplary embodiment of the present disclosure, the business information includes organization entities, transaction data, enterprise data, enterprise structure data and the like. In an embodiment of the present disclosure, the organization entities, the transaction data, the enterprise data, the enterprise structure data and the like are collectively called as business datasets that provide critical information about the business & its workings. For example, the organization entities include customers, products, locations, and the like. The transaction data includes sales orders, loan applications, purchase orders and the like. Further, the enterprise structure data includes bill of materials, organization hierarchy, sales territory hierarchy and the like. In an exemplary embodiment of the present disclosure, the one or more subject matter experts may be one or more business users, one or more decision makers or a combination thereof. In an embodiment of the present disclosure, the business information is extracted via knowledge solicitation from the one or more workshops, the one or more meetings or a combination thereof. For example, the one or more workshops may be joint workshops. Furthermore, the AI-based method 600 includes generating the one or more business goals based on the determined one or more market trends and the received business information by using the data management-based AI model. In an exemplary embodiment of the present disclosure, the one or more goals may be quantitative business goals desired to be achieved by the one or more users.

Further, AI-based method 600 includes determining one or more diagnosis parameters associated with the business enterprise based on the received request, the generated set of KPIs and metrics and the determined health of the business enterprise by using the data management-based AI model. In an embodiment of the present disclosure, the one or more diagnosis parameters helps into different areas for diagnostic analysis. In an exemplary embodiment of the present disclosure, the one or more diagnosis parameters for insurance claims processing include view claims, diagnose process bottlenecks, claims analysis, fraudulent claims and the like.

At step 608, the set of insights associated with the business enterprise are predicted based on the received request, the generated set of KPIs and metrics, the determined health of the business enterprise and one or more diagnosis parameters by using the data management-based AI model. In an embodiment of the present disclosure, the set of insights are in form of future state metrics and KPIs. In an exemplary embodiment of the present disclosure, the set of insights for insurance claims processing include forecast claims volume for predefined period of time, predict fraudulent claims, forecast pay-outs amount for predefined period of time, predict fast track claims and the like. In an embodiment of the present disclosure, the one or more users may adapt to the set of insights via simulation, optimization and the like. The optimization is a method which aims to achieve business goals efficiently by optimizing the business processes subject to various constraints. In an embodiment of the present disclosure, optimized processes lead to efficient business outcomes. Further, the simulation is a process by which business ascertain changes to output based on changes to inputs in a time-variant manner in which system is subject to non-linear interactions. In an embodiment of the present disclosure, a simulation model represents a real-world business process.

At step 610, the determined health of the business enterprise, the determined one or more diagnosis parameters and the predicted set of insights are outputted on user interface screen of the one or more electronic devices 108 associated with the one or more users. In an embodiment of the present disclosure, the one or more users make one or more business decisions based on the outputted health of the business enterprise, the one or more diagnosis parameters and the set of insights. In an embodiment of the present disclosure, the one or more diagnosis parameters are outputted on the user interface screen of the one or more electronic devices 108 in one or more formats. In an exemplary embodiment of the present disclosure, the one or more formats include cubes, dashboards, report and the like. In an embodiment of the present disclosure, the determined health of the business enterprise, the determined one or more diagnosis parameters and the predicted set of insights are outputted on the user interface screen via different levels or panels.

In an embodiment of the present disclosure, each decision canvas includes two underlying configuration files which store all relevant details for creating the decision canvas. In an exemplary embodiment of the present disclosure the two underlying configuration files are in JavaScript Object Notation (JSON) format. The two underlying configuration files are stored in the storage unit.

The AI-based method 600 includes receiving business requirements from the one or more users via the one or more electronic devices 108. In an embodiment of the present disclosure, to build a business canvas solution, a lead consultant talks to a business team and identifies a business objective, corresponding goals, available data maturity, and measurable outcomes for evaluation. Further, the lead consultant then discusses with an offshore team to develop hypotheses, design a solution approach, and build a solution. The solution is then presented to client teams, reviewed, and then deployed as required. For example, the business requirements may include how are the current performances of business processes, what are the root causes of performance issues, how can the business predict and adapt to the future and the like. Further, the AI-based method 600 includes determining one or more artifact parameters based on the received business requirements by using the data management-based AI model. In an exemplary embodiment of the present disclosure, the one or more artifact parameters include actual artifacts, screen configuration, artifacts configuration and the like. Furthermore, the AI-based method 600 includes generating the set of artifacts based on the received business requirements and the determined one or more artifact parameters by using the data management-based AI model. In an embodiment of the present disclosure, the set of artifacts are set of KPIs and metrics of business processes computed and stored in the storage unit 206. Each component or artifact in a decision canvas is built from a low code engine that serves as superset of all artifacts required to create the decision canvas. In an embodiment of the present disclosure, depending on a particular requirement for the decision canvas, a subset of the components may be selected to create a solution. For example, the set of artifacts across different industries include claims outstanding, average TAT, number of calls in last 24 hours, average response time and the like. In an embodiment if the present disclosure, the set of artifacts are outputted on the user interface screen of the one or more electronic devices 108, such that the one or more users may make the one or more business decisions in real-world. Further, each component in the decision canvas is built from a low code engine that serves as a superset of the set of artifacts required to create the decision canvas. In an embodiment of the present disclosure, depending on a particular requirement for the decision canvas, a subset of these components may be chosen to build the decision canvas.

In an embodiment of the present disclosure, the AI-based method 600 includes generating one or more feedbacks associated with the one or more business goals by comparing the one or more business goals with the current business data by using the data management-based AI model. In an exemplary embodiment of the present disclosure, the one or more feedbacks corresponds to one or more categories, such as performance against pre-set goals, decisions taken based on predictive capability of the canvas which in turn have proven to be wrong or not successful and business process simulations performed with embedded ML or AI models to view possible realities and the feedback from the simulation models helps to recalibrate the models. In an embodiment of the present disclosure, the one or more feedbacks may facilitate in retraining the data management-based AI model. In an embodiment of the present disclosure, the one or more feedbacks are provided to the one or more subject matter experts to update the one or more business goals.

The AI-based method 600 may be implemented in any suitable hardware, software, firmware, or combination thereof.

Figure 7A:
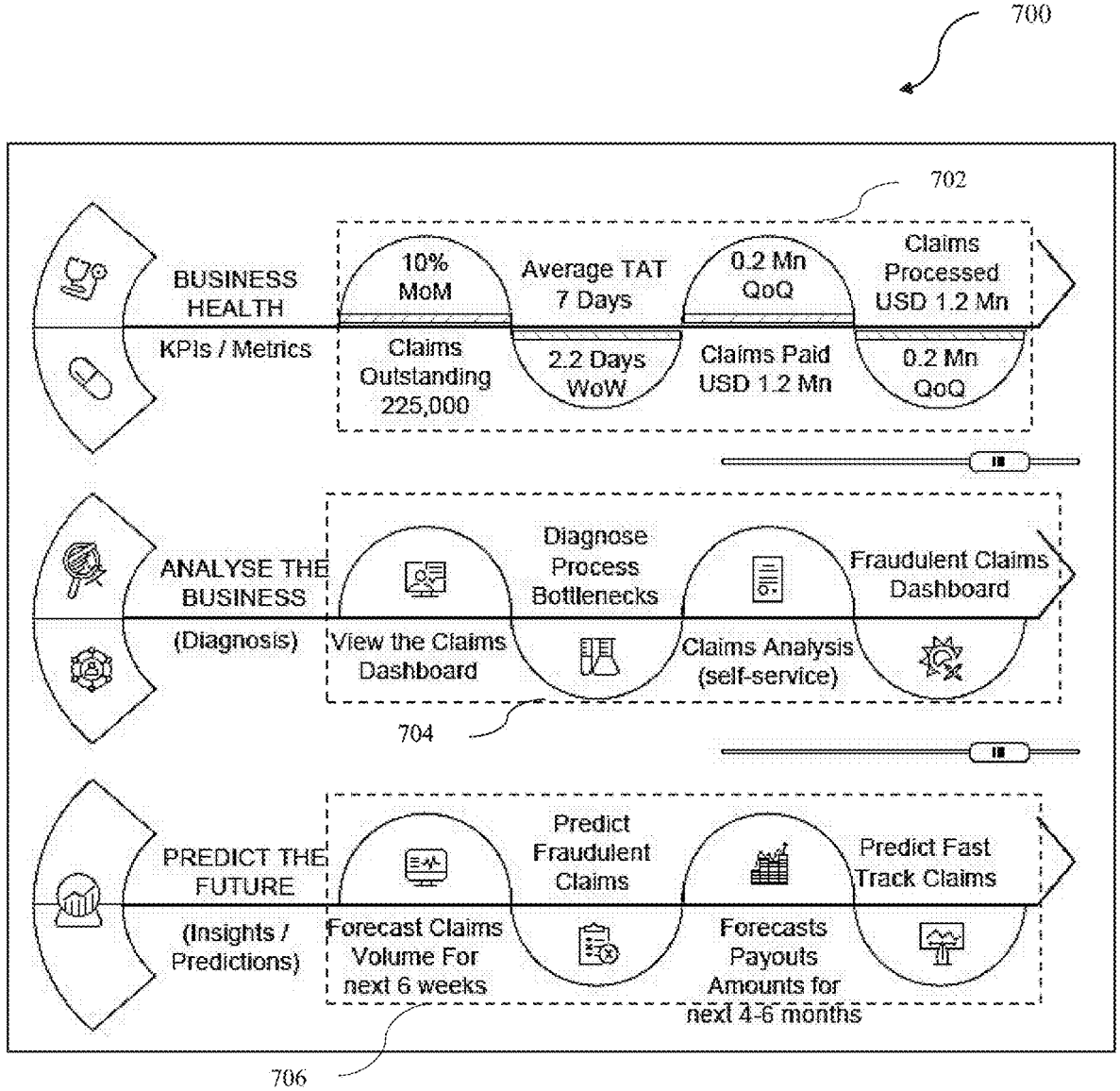
FIG. 7A is a graphical user interface screen of the AI-based computing system for analyzing businesses data to make business decisions, in accordance with an embodiment of the present disclosure.

FIG. 7A is a graphical user interface screen 700 of the AI-based computing system 104 for analyzing businesses data to make business decisions, in accordance with an embodiment of the present disclosure. The graphical user interface screen 700 of FIG. 7A shows an exemplary business canvas for insurance claims processing at three levels or panels. At first level, the set of KPIs and metrics 702 for insurance claims, such as 10% MoM, claims outstanding 225000, Average Turn Around Time (TAT) 7 days, 2.2 days WoW, claims paid USD 1.2 Mn, claims processed USD 1.2 Mn and Min QoQ 0.2 Mn, are shown. At second level, the one or more diagnosis parameters 704 for insurance claims processing, such as view claims dashboard, diagnose process bottlenecks, claims analysis, download fraudulent claims, and fraudulent claims dashboard, are shown. At third level, the set of insights 706 for insurance claims processing, such as forecast claims volume for six weeks, predict fraudulent claims, forecast pay-outs amount for four to six months, scenario analysis of claims pay-outs, optimize claims processing time and predict fast track claims, are shown.

Figure 7B:
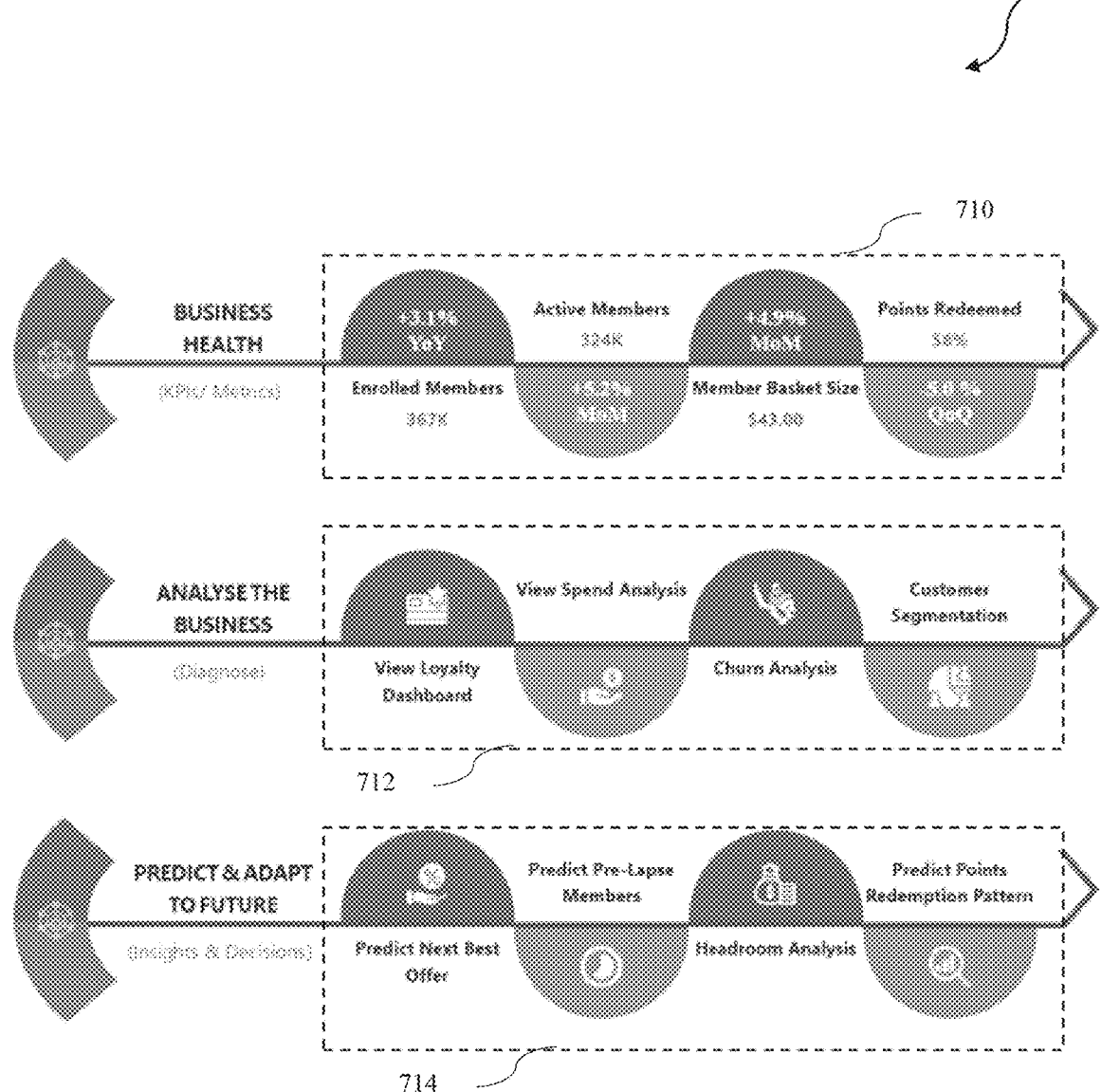
FIG. 7B is a graphical user interface screen of the AI-based computing system for analyzing businesses data to make business decisions, in accordance with another embodiment of the present disclosure.

FIG. 7B is a graphical user interface screen 708 of the AI-based computing system 104 for analyzing businesses data to make business decisions, in accordance with another embodiment of the present disclosure. The graphical user interface screen 708 of FIG. 7B shows an exemplary loyalty management decision canvas for head of loyalty to view and monitor business. The loyalty management decision canvas processes business data at three levels or panels for program performance view for head of loyalty. At first level, the set of KPIs and metrics 710 for business health, such as +3.1% Year over Year (YoY), enrolled members 567K, active members, +5.2% MoM, member basket size $43.00, points redeemed 58% and −5.0% QoQ, are shown. At second level, the one or more diagnosis parameters 712 for analyzing the business, such as view loyalty dashboard, view spend analysis, churn analysis, and customer segmentation, are shown. At third level, the set of insights 714 for predicting and adapting to future, such as predict next best offer, predict pre-lapse members, headroom analysis and predict points redemption patterns, are shown.

Figure 8:
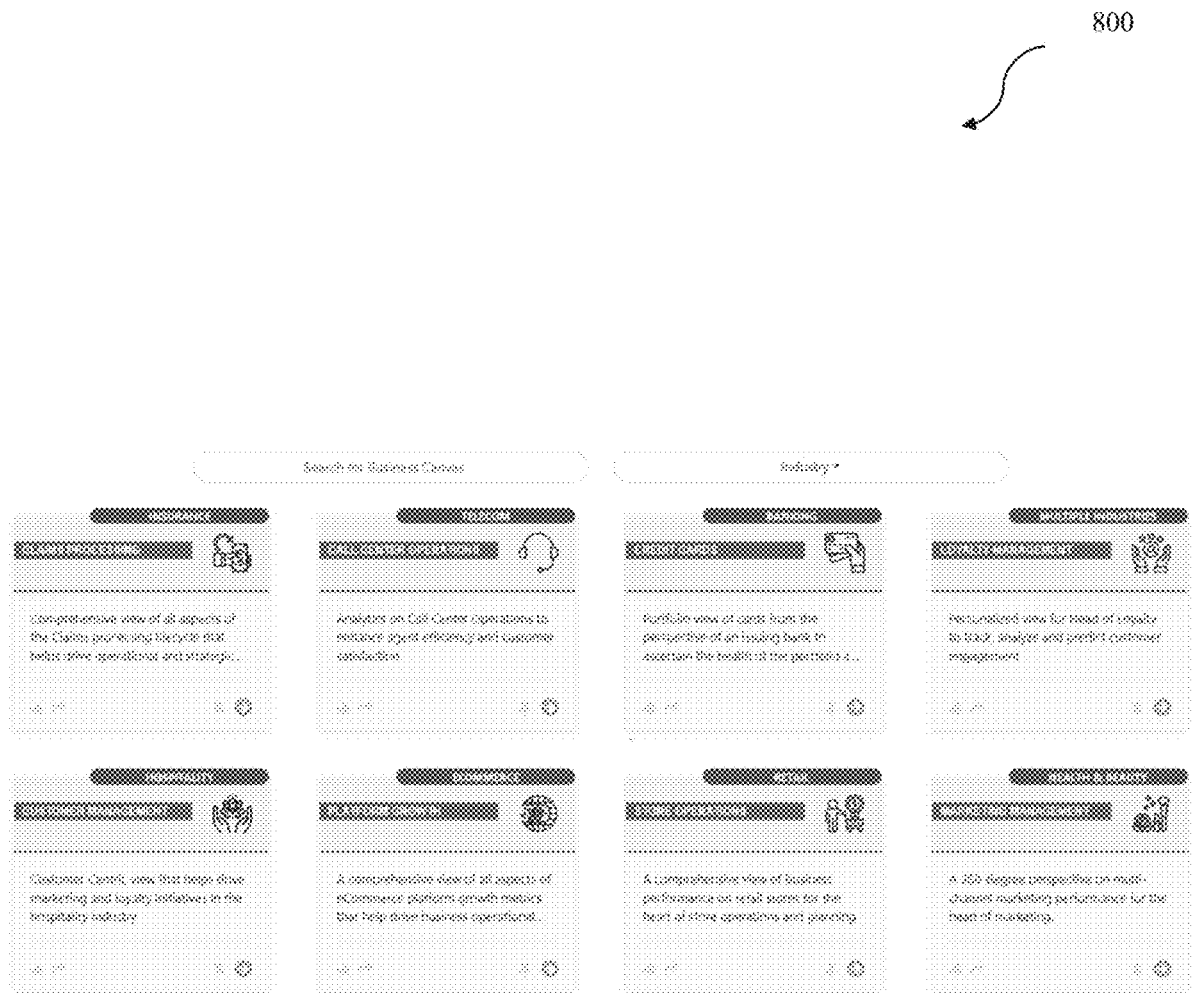
FIG. 8 is a graphical user interface screen of the AI-based computing system depicting a set of decision canvas from a plurality of segments and industries, in accordance with an embodiment of the present disclosure.

FIG. 8 is a graphical user interface screen 800 of the AI-based computing system 104 depicting a set of decision canvas from a plurality of segments and industries, in accordance with an embodiment of the present disclosure. The graphical user interface screen 800 is a landing page of decision canvas. In an embodiment of the present disclosure, the landing page of decision canvas corresponds to the set of decision canvas from the plurality of segments and industries. For example, the plurality of segments and industries may be insurance, telecom, banking, hospitality, ecommerce, retail and the like, as shown in FIG. 8.

Figure 9:
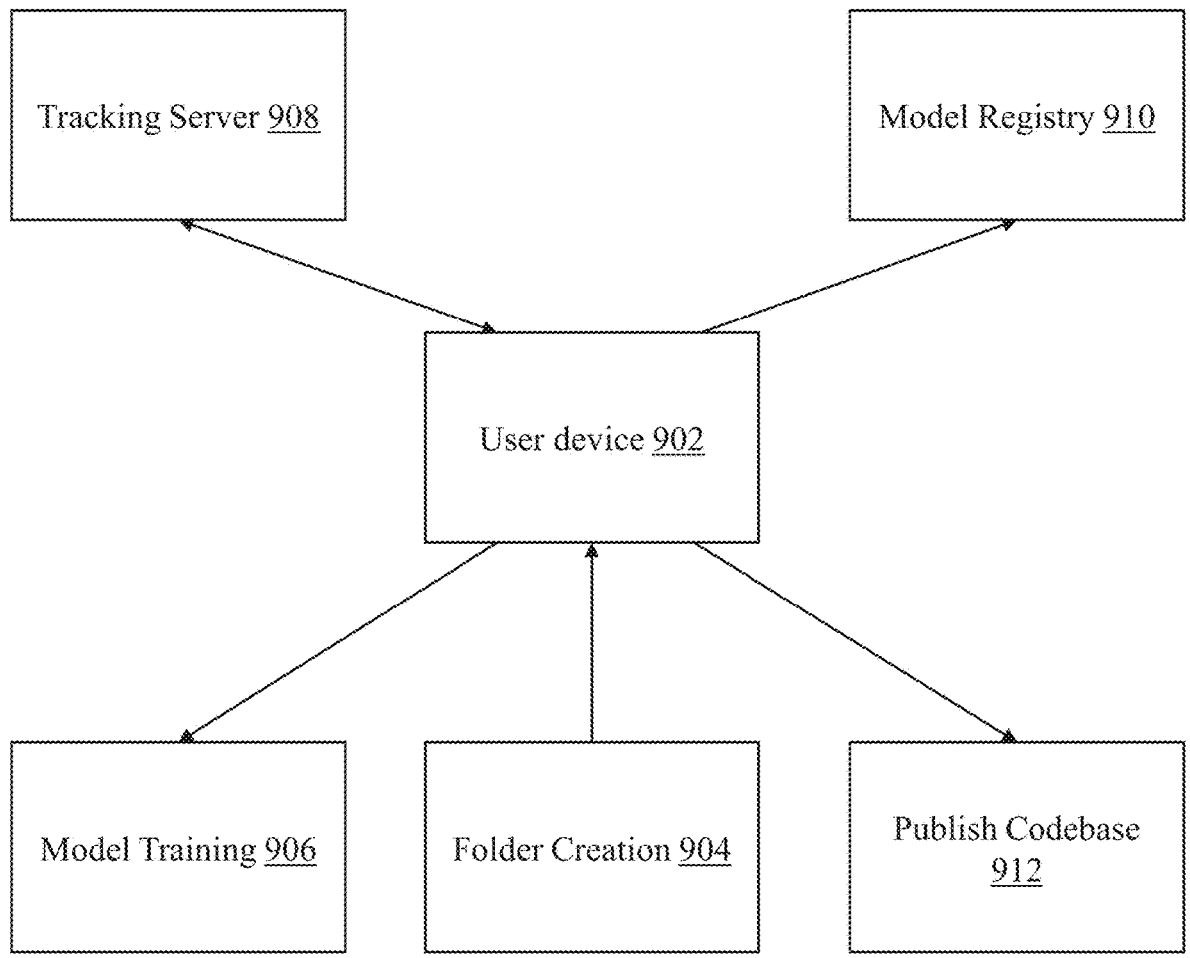
FIG. 9 is a is a block diagram illustrating an exemplary AI model development cycle, in accordance with an embodiment of the present disclosure.

FIG. 9 is a is a block diagram illustrating an exemplary AI model development cycle, in accordance with an embodiment of the present disclosure. In an embodiment of the present disclosure, a user device 902 corresponds to a data scientist's local machine. At 904, every AI Model is created with a common base folder structure. In an embodiment of the present disclosure, Cookie cutter user is used to create required folder structure and copy mandatory template files into a folder. At 906, an exploratory data analysis is performed to analyse a dataset and to identify type of AI models to be applied. In an embodiment of the present disclosure, required models are trained using a set of predefined templates of corresponding templates. Further, selected AI models are implemented and trained using transfer learning with MLFlow logging to provide expected outcomes. In an embodiment of the present disclosure, multiple models are trained, and parameters are logged. Based on the logged parameters, user may select the best model to be logged. At 908, multiple versions of the AI modes are saved within experiments using multiple components within tracking server. At step 910, all selected AI models' performances are analysed and compared to select final best AI model. Once final AI model is selected, it is packaged as docker container via BentoML library to be deployed and used as part of the decision canvas. In an embodiment of the present disclosure, a set of artifacts of the best performing AI models are bundled and get registered in BentoML. In an embodiment of the present disclosure, the set of artifacts are created for logged models. At step 912, the user zips and publish codebase in gitlab after model registration. In an embodiment of the present disclosure, steps 904 and 906 are executed on the user device 902 or the computing environment 100. Furthermore, steps 908, 910 and 912 are executed at data centre i.e., the storage unit 206.

Thus, various embodiments of the present AI-based computing system 104 provide a solution to analyse businesses data to make business decisions. The AI-based computing system 104 corresponds to the business canvas, which is a unified, collaborative platform that helps individuals & teams to make decisions from the business data. n an embodiment of the present disclosure, the decision canvas is a personalized view for a business decision maker that helps him or her to take decisions from the business data. Since the AI-based computing system 104 is related to business decision making and it is applicable to all industries and stakeholders responsible for taking strategic, tactical, and operational decisions. Further, the AI-based computing system 104 increases business value as the decision canvas has single-minded focus to create business value from data by utilizing it for decision making at all levels in the business enterprise. The AI-based computing system 104 achieves personalization as each decision canvas is personalized to one or more business users utilizing it to make decisions. Furthermore, the AI-based computing system 104 achieves unification as it brings in all the different components used for decision making in one single unified place. In an embodiment of the present disclosure, the business canvas may be shared among users, team or a combination thereof as required. Further, the AI-based computing system 104 is continuously learning and improving as each component in the business canvas is a self-contained entity and thus, may be modified, recalibrated or revamped based on feedback and usage. The AI-based computing system 104 is fully Transparent and not a black box. Furthermore, the AI-based computing system 104 is orchestrated using open-source components and thus, it is very cost effective. The AI-based computing system 104 brings power of all data driven decision making tools all in one place, whereas many other solutions have a siloed approach. Further, adoption of the AI-based computing system 104 is personalized for one or more decision makers as opposed to being a generic tool. The AI-based computing system 104 is configuration driven and has low code, hence, faster to implement and may be modified quickly as appropriate. Further, the AI-based computing system 104 may be used in healthcare field to take decisions to improve healthcare delivery for patients by creating relevant health plans, optimizing the cost of care delivery and enhancing favourable health outcomes. The AI-based computing system 104 may be used in insurance field to monitor status of claims processing, forecasting the number of claims, predicting fraudulent claims and removing bottlenecks to increase throughput of processed claims. Furthermore, the AI-based computing system 104 may be used in financial services to monitor regulatory compliance in financial services and taking actions to improve compliance, reduce risk and enhance governance. The AI-based computing system 104 may also be used in retail field to provide personalized recommendations to customer and also evaluate efficacy of such recommendations from the customer as well as the retailer perspective. Further, the AI-based computing system 104 may be used in telecom field to optimize service delivery of telecom providers by helping them take decisions related to service provisioning, complaints handling and cross sell recommendations. In an embodiment of the present disclosure, the AI-based computing system 104 is fully transparent and not a black box. Furthermore, the AI-based computing system 104 is orchestrated using open-source components and thus, the AI-based computing system 104 is very cost effective. The AI-based computing system 104 brings power of all data driven decision making tools in one place, whereas many other solutions have a siloed approach. The AI-based computing system 104 is personalized for one or more decision makers as opposed to being a generic tool. Further, the AI-based computing system 104 is configuration driven & low code, thus faster to implement and may be quickly modified as appropriate. The AI-based computing system 104 may be tuned to market trends and corrected based on feedback.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. An Artificial Intelligence (AI) based computing system for analyzing businesses data to make business decisions, the AI-based computing system comprising:
   one or more hardware processors; and
   a memory coupled to the one or more hardware processors, wherein the memory comprises a plurality of modules in the form of programmable instructions executable by the one or more hardware processors, wherein the plurality of modules comprises:
      a data receiver module configured to receive a request from one or more users via one or more electronic devices to predict a set of insights associated with a business enterprise, wherein the request comprises: one or more business goals, current business data, department of the one or more users and data context;
      a metric generation module configured to generate a set of Key Performance Indicators (KPIs) and metrics associated with the business enterprise based on the received request by using a data management-based AI model, wherein the data management-based AI model is generated based on performing steps comprises,
         selecting one or more template files for storing within a predefined folder structure;
         determining a plurality of AI models based on the one or more business goals, the current business data, the department of the one or more users, and the data context;
         providing customized training to determined plurality of AI models based on a set of predefined templates and historical data from the predefined folder structure;
         executing trained plurality of AI models using transfer learning technique with an open-source platform to provide expected outcomes;
         comparing multiple versions of the expected outcomes of the plurality of AI models to evaluate performance of each AI model of the plurality of AI models; and
         selecting the data management-based AI model from the plurality of AI models based on evaluated performance of each AI model of the plurality of AI models, wherein selected data management-based AI model is further packaged as a docker container through an open-source library:
      a health determination module configured to determine health of the business enterprise based on the received request and the generated set of KPIs and metrics by using the data management-based AI model, wherein the health of the business enterprise represents current state of the business enterprise with respect to the one or more business goals;
      an insight prediction module configured to predict the set of insights associated with the business enterprise based on the received request, the generated set of KPIs and metrics, the determined health of the business enterprise and one or more diagnosis parameters by using the data management-based AI model, wherein the one or more users utilizes predicted set of insights through optimization and simulation,
         wherein the optimization is configured to optimize business processes associated with the business enterprise subject to one or more constraints, to optimize business outcomes,
         wherein the simulation is configured to ascertain changes within the business enterprise in a time-variant manner, subject to non-linear interactions; and
      a data output module configured to output the determined health of the business enterprise, the one or more diagnosis parameters and the predicted set of insights on user interface screen of the one or more electronic devices associated with the one or more users, wherein the one or more users make one or more business decisions based on the outputted health of the business enterprise, the one or more diagnosis parameters and the set of insights.

2. The AI-based computing system of claim 1, further comprises a diagnosis determination module configured to determine the one or more diagnosis parameters associated with the business enterprise based on the received request, the generated set of KPIs and metrics and the determined health of the business enterprise by using the data management-based AI model.

3. The AI-based computing system of claim 2, wherein the set of KPIs and metrics for insurance claims processing comprise: MoM, claims outstanding, Average Turn Around Time (TAT), WOW, claims paid, claims processed and Min QoQ.

4. The AI-based computing system of claim 1, wherein the one or more diagnosis parameters for insurance claims processing comprise: view claims, diagnose process bottlenecks, claims analysis and fraudulent claims.

5. The AI-based computing system of claim 1, wherein the set of insights for insurance claims processing comprise: forecast claims volume for predefined period of time, predict fraudulent claims, forecast pay-outs amount for predefined period of time and predict fast track claims.

6. The AI-based computing system of claim 1, wherein in determining the health of the business enterprise based on the received request and the generated set of KPIs and metrics by using the data management-based AI model, the health determination module configured to:
   compare the one or more business goals with the current business data by using the data management-based AI model;

correlate result of the comparison with the department of the one or more users, the data context and the set of KPIs and metrics by using the data management-based AI model; and determine the health of the business enterprise based on result of the correlation by using the data management-based AI model.

7. The AI-based computing system of claim 1, wherein the one or more diagnosis parameters are outputted on the user interface screen of the one or more electronic devices in one or more formats, wherein the one or more formats comprise: cubes, dashboards and reports.

8. The AI-based computing system of claim 1, further comprises an artifact generation module configured to:

receive business requirements from the one or more users via the one or more electronic devices;

determine one or more artifact parameters based on the received business requirements by using the data management-based AI model, wherein the one or more artifact parameters comprise: actual artifacts, screen configuration and artifacts configuration; and generate a set of artifacts based on the received business requirements and the determined one or more artifact parameters by using the data management-based AI model.

9. The AI-based computing system of claim 1, further comprises a business goal generation module configured to:

receive market data associated with one or more business organizations from an external database;

determine one or more market trends by using the data management-based AI model;

receive business information from one or more subject matter experts via at least one of: one or more workshops and one or more meetings; and generate the one or more business goals based on the determined one or more market trends and the received business information by using the data management-based AI model.

10. The AI-based computing system as claimed in claim 1, further comprises a feedback generation module configured to generate one or more feedbacks associated with the one or more business goals by comparing the one or more business goals with the current business data by using the data management-based AI model.

11. An Artificial intelligence (AI) based method for analyzing businesses data to make business decisions, the AI-based method comprising:

receiving, by one or more hardware processors, a request from one or more users via one or more electronic devices to predict a set of insights associated with a business enterprise, wherein the request comprises: one or more business goals, current business data, department of the one or more users and data context;

generating, by the one or more hardware processors, a set of Key Performance Indicators (KPIs) and metrics associated with the business enterprise based on the received request by using a data management-based AI model, wherein the data management-based AI model is generated based on performing steps comprises, selecting one or more template files for storing within a predefined folder structure;

determining a plurality of AI models based on the one or more business goals, the current business data, the department of the one or more users, and the data context;

providing customized training to determined plurality of AI models based on a set of predefined templates and historical data from the predefined folder structure;

executing trained plurality of AI models using transfer learning technique with an open-source platform to provide expected outcomes;

comparing multiple versions of the expected outcomes of the plurality of AI models to evaluate performance of each AI model of the plurality of AI models; and selecting the data management-based AI model from the plurality of AI models based on evaluated performance of each AI model of the plurality of AI models, wherein selected data management-based AI model is further packaged as a docker container through an open-source library;

determining, by the one or more hardware processors, health of the business enterprise based on the received request and the generated set of KPIs and metrics by using the data management-based AI model, wherein the health of the business enterprise represents current state of the business enterprise with respect to the one or more business goals;

predicting, by the one or more hardware processors, the set of insights associated with the business enterprise based on the received request, the generated set of KPIs and metrics, the determined health of the business enterprise and one or more diagnosis parameters by using the data management-based AI model, wherein the one or more users utilizes predicted set of insights through optimization and simulation, wherein the optimization is configured to optimize business processes associated with the business enterprise subject to one or more constraints, to optimize business outcomes, wherein the simulation is configured to ascertain changes within the business enterprise in a time-variant manner, subject to non-linear interactions; and outputting, by the one or more hardware processors, the determined health of the business enterprise, the one or more diagnosis parameters and the predicted set of insights on user interface screen of the one or more electronic devices associated with the one or more users, wherein the one or more users make one or more business decisions based on the outputted health of the business enterprise, the one or more diagnosis parameters and the set of insights.

12. The AI-based method of claim 11, further comprises determining the one or more diagnosis parameters associated with the business enterprise based on the received request, the generated set of KPIs and metrics and the determined health of the business enterprise by using the data management-based AI model.

13. The AI-based method of claim 12, wherein the set of KPIs and metrics for insurance claims processing comprise: MoM, claims outstanding, Average Turn Around Time (TAT), WOW, claims paid, claims processed and Min QoQ.

14. The AI-based method of claim 11, wherein the one or more diagnosis parameters for insurance claims processing comprise: view claims, diagnose process bottlenecks, claims analysis and fraudulent claims.

15. The AI-based method of claim 11, wherein the set of insights for insurance claims processing comprise: forecast claims volume for predefined period of time, predict fraudulent claims, forecast pay-outs amount for predefined period of time and predict fast track claims.

16. The AI-based method of claim 11, wherein determining the health of the business enterprise based on the received request and the generated set of KPIs and metrics by using the data management-based AI model comprises:
- comparing the one or more business goals with the current business data by using the data management-based AI model;
- correlating result of the comparison with the department of the one or more users, the data context and the set of KPIs and metrics by using the data management-based AI model; and
- determining the health of the business enterprise based on result of the correlation by using the data management-based AI model.

17. The AI-based method of claim 11, wherein the one or more diagnosis parameters are outputted on the user interface screen of the one or more electronic devices in one or more formats, wherein the one or more formats comprise: cubes, dashboards and reports.

18. The AI-based method of claim 11, further comprises:
- receiving business requirements from the one or more users via the one or more electronic devices;
- determining one or more artifact parameters based on the received business requirements by using the data management-based AI model, wherein the one or more artifact parameters comprise: actual artifacts, screen configuration and artifacts configuration; and
- generating a set of artifacts based on the received business requirements and the determined one or more artifact parameters by using the data management-based AI model.

19. The AI-based method of claim 11, further comprises:
- receiving market data associated with one or more business organizations from an external database;
- determining one or more market trends by using the data management-based AI model;
- receiving business information from one or more subject matter experts via at least one of: one or more workshops and one or more meetings; and
- generating the one or more business goals based on the determined one or more market trends and the received business information by using the data management-based AI model.

20. The AI-based method as claimed in claim 11, further comprises generating one or more feedbacks associated with the one or more business goals by comparing the one or more business goals with the current business data by using the data management-based AI model.

* * * * *